US012609017B2

(12) United States Patent
Gish et al.

(10) Patent No.: US 12,609,017 B2
(45) Date of Patent: Apr. 21, 2026

(54) ELECTRONIC RESTRAINT DEVICE

(71) Applicant: Axon Enterprise, Inc., Scottsdale, AZ (US)

(72) Inventors: Michael E. Gish, Scottsdale, AZ (US); Patrick W. Smith, Scottsdale, AZ (US); Jaspaul Chung, Vancouver (CA)

(73) Assignee: Axon Enterprise, Inc., Scottsdale, AZ (US)

(*) Notice: Subject to any disclaimer, the term of this patent is extended or adjusted under 35 U.S.C. 154(b) by 27 days.

(21) Appl. No.: 18/691,942

(22) PCT Filed: Sep. 22, 2022

(86) PCT No.: PCT/US2022/044425
§ 371 (c)(1),
(2) Date: Mar. 14, 2024

(87) PCT Pub. No.: WO2023/064079
PCT Pub. Date: Apr. 20, 2023

(65) Prior Publication Data

US 2025/0131808 A1 Apr. 24, 2025

Related U.S. Application Data

(60) Provisional application No. 63/247,274, filed on Sep. 22, 2021.

(51) Int. Cl.
*G08B 21/02* (2006.01)
*E05B 75/00* (2006.01)
(Continued)

(52) U.S. Cl.
CPC .............. *G08B 21/02* (2013.01); *E05B 75/00* (2013.01); *G08B 7/06* (2013.01); *G08B 21/182* (2013.01); *G08B 25/10* (2013.01)

(58) Field of Classification Search
CPC ........ G08B 21/02; G08B 7/06; G08B 21/182; G08B 25/10; G08B 27/001;
(Continued)

(56) References Cited

U.S. PATENT DOCUMENTS

| | | | |
|---|---|---|---|
| 9,771,742 | B1 | 9/2017 | Reed et al. |
| 2013/0012795 | A1 | 1/2013 | Moenning et al. |

(Continued)

FOREIGN PATENT DOCUMENTS

| | | | |
|---|---|---|---|
| CN | 105629839 | A | 6/2016 |
| CN | 112160658 | A | 1/2021 |

(Continued)

OTHER PUBLICATIONS

Korean Intellectual Property Office, International Search Report for International Application No. PCT/US2022/044425 mailed Jun. 14, 2023.

(Continued)

*Primary Examiner* — Quan Zhen Wang
*Assistant Examiner* — Rajsheed O Black-Childress
(74) *Attorney, Agent, or Firm* — Justin Powley

(57) ABSTRACT

An electronic restraint device may detect biometric information. The electronic restraint device may compare the biometric information with alert criteria. Based on the comparison, the electronic restraint device may generate an alert. The alert may be transmitted to an electronic device. The alert may be output by the electronic restraint device or the electronic device. The alert may cause the electronic restraint device to modulate a restraint device property.

20 Claims, 7 Drawing Sheets

(51) Int. Cl.
*G08B 7/06* (2006.01)
*G08B 21/18* (2006.01)
*G08B 25/10* (2006.01)

(58) Field of Classification Search
CPC . G08B 21/0453; E05B 75/00; E05B 17/0083; E05B 2047/0095; E05B 45/06; A61B 5/01; A61B 5/6825; A61B 5/33; A61B 5/02055; A61B 5/14551; A61B 5/6843; A61B 5/746
See application file for complete search history.

(56) References Cited

U.S. PATENT DOCUMENTS

| | | | | |
|---|---|---|---|---|
| 2014/0260440 | A1* | 9/2014 | Lash | E05B 75/00 70/16 |
| 2014/0355167 | A1 | 12/2014 | Reese et al. | |
| 2020/0131807 | A1 | 4/2020 | Heiney | |
| 2022/0207635 | A1* | 6/2022 | Hughes | E05B 45/00 |

FOREIGN PATENT DOCUMENTS

| | | |
|---|---|---|
| KR | 101938989 B1 | 4/2019 |
| KR | 101970649 B1 | 8/2019 |

OTHER PUBLICATIONS

The International Bureau of WIPO, International Preliminary Report on Patentability for International Application No. PCT/US22/44425 mailed Apr. 4, 2024.

European Patent Office, Extended European Search Report for European Patent Application No. 22881547.8, mailed Jun. 25, 2025.

* cited by examiner

ELECTRONIC RESTRAINT DEVICE

FIELD

Embodiments of the present disclosure relate to an electronic restraint device.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of various embodiments refers to the accompanying drawings, which show various embodiments by way of illustration. While these various embodiments are described in sufficient detail to enable those skilled in the art to practice the disclosure, it should be understood that other embodiments may be realized, and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Furthermore, any reference to singular includes plural embodiments, and any reference to more than one component may include a singular embodiment.

Figure 1A:
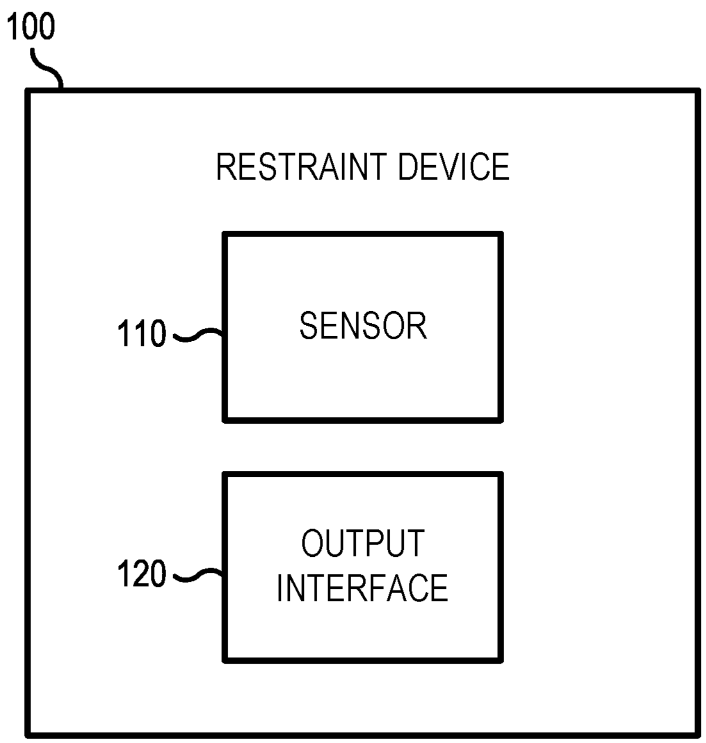
FIG. 1A is a block diagram illustrating a restraint device, in accordance with various embodiments.

In various embodiments, and with reference to FIG. 1A, a restraint device 100 is disclosed. Restraint device 100 may be configured to at least partially restrain movement of a human, an animal, or the lie. For example, restraint device 100 may comprise a physical restraint configured to at least partially limit physical movement of a human. In that respect, restraint device 100 may comprise handcuffs, leg irons, waist chains, seat restraints, and/or the like. In some embodiments, restraint device 100 may comprise a physical restraint used by a law enforcement officer, security personnel, emergency personnel, or the like on a suspect or unruly human. Restraint device 100 may be configured to at least partially receive a body part from a human to at least partially limit physical movement of the body part or associated appendages of the human.

Restraint device 100 may comprise mechanical, electrical, and/or electronic components. For example, mechanical components of restraint device 100 may be configured to allow restraint device 100 to at least partially restrain a human. The electrical and/or electronic components may perform different tasks and/or operations, as discussed further herein. Restraint device 100 may comprise one or more software and/or hardware components. For example, restraint device 100 may comprise hardware such as a processing unit, a communications unit, a memory unit, an input device, and/or an output device. Restraint device 100 may comprise software configured to manage and/or interact with the hardware components, such as, for example, an operating system, user interfaces, software applications, and/or the like.

Restraint device 100 may include a processor in electronic communication with a computer-readable medium. The computer-readable medium may store, retrieve, and/or organize data. As used herein, the term "computer-readable medium" includes any storage medium that is readable by a machine (e.g., computer, processor, processing circuit, etc.). Storage medium includes any devices, materials, and/or structures used to place, keep, and retrieve data (e.g., information). A storage medium may be volatile or non-volatile. A storage medium may include any semiconductor (e.g., RAM, ROM, EPROM, flash, etc.), magnetic (e.g., hard disk drive (HDD), etc.), solid state (e.g., solid-state drive (SSD), etc.), optical technology (e.g., CD, DVD, etc.), or combination thereof. A computer-readable medium may include a storage medium that is removable or non-removable from a system. A computer-readable medium may store any type of information, organized in any manner, and usable for any purpose such as computer readable instructions, data structures, program modules, or other data. The computer-readable medium may comprise a tangible, non-transitory computer-readable medium. The tangible, non-transitory computer-readable medium may include instructions stored thereon. Upon execution by the processor, the instructions may allow the processor to perform various functions and operations disclosed herein.

In various embodiments, restraint device 100 may comprise or be in communication with a sensor 110. Sensor 110 may be configured to detect biometric information of a human restrained by or in contact with restraint device 100. In some embodiments, sensor 110 may also be configured to detect status information, physical properties, or the like of restraint device 100. Detecting biometric information, status information, physical properties, or the like may include detecting, capturing, measuring, and/or receiving the biometric information, status information, physical properties, or the like. Sensor 110 may comprise any suitable hardware, software, and/or mechanical or electrical components configured to aid sensor 110 in detecting information. Sensor 110 may comprise one or more sensors. Sensor 110 may comprise a plurality of different sensors each configured to detect, capture, measure, and or receive a different type of information or property. Sensory 110 may comprise one or more of the following sensors described herein.

In various embodiments, sensor 110 may comprise a heart rate sensor. The heart rate sensor may be configured to detect (e.g., detect, capture, measure, receive, calculate, etc.) a heart rate of a human restrained by or in contact with restraint device 100. The heart rate sensor may comprise any suitable sensor, device, or the like capable of detecting a heart rate. For example, the heart rate sensor may comprise an electrical sensor (e.g., ECG (Electrocardiogram) sensor) configured to measure a bio-potential generated by electrical signals that control the expansion and contraction of the heart, an optical sensor (e.g., PPG (Photoplethysmography) sensor) configured to measure heart rate by emitting a light, and/or the like.

In various embodiments, sensor 110 may comprise a skin temperature sensor. The skin temperature sensor may be configured to detect (e.g., detect, capture, measure, receive, calculate, etc.) the skin temperature of a human restrained by or in contact with restraint device 100. The skin temperature sensor may comprise any suitable sensor, device, or the like capable of detecting the skin temperature. For example, the skin temperature sensor may comprise a digital thermometer, a device configured to measure infrared energy, and/or the like. The skin temperature sensor may comprise a contact thermometer. The contact thermometer may be configured to detect (e.g., detect, capture, measure, receive, calculate, etc.) a temperature of a human's skin (or proximate area). The contact thermometer may comprise any suitable contact sensor, device, resistance thermometer (PRT), thermistor, thermocouple, or the like capable of detecting skin temperature.

In various embodiments, sensor 110 may comprise a pulse oximeter. The pulse oximeter may be configured to detect (e.g., detect, capture, measure, receive, calculate, etc.) a blood oxygen saturation level of a human restrained by or in contact with restraint device 100. The pulse oximeter may comprise any suitable sensor, device, or the like capable of detecting oxygen saturation levels. For example, the pulse oximeter may comprise a device configure to emit light beams to detect the oxygen saturation of the blood.

In various embodiments, sensor 110 may comprise a pressure sensor. The pressure sensor may be configured to detect (e.g., detect, capture, measure, receive, calculate, etc.) a pressure of a human's appendage (e.g., limb, skin, wrists, hands, legs, etc.) against or in contact with restraint device 100. The pressure sensor may comprise any suitable sensor, transducer, switch, or the like configured to detect pressure and/or convert pressure into an analog electrical signal.

In various embodiments, sensor 110 may comprise a motion detector. The motion detector may be configured to detect (e.g., detect, capture, measure, receive, calculate, etc.) movement of restraint device 100. Movement may be detected along one or more axes. For example, one or more detectors may detect movement along an x-axis, a y-axis, and/or a z-axis of a Cartesian coordinate system. The motion detector may detect a physical quantity (e.g., heat, electricity, vibration, radio wave, electromagnetic wave, gravity, etc.) to detect motion. The motion detector may detect motion in one or more directions. The motion detector may detect and/or relate detection of motion, or the lack thereof, to any coordinate system. The motion detector may detect a force of gravity. The motion detector may use the force of gravity to detect movement of restraint device 100. The motion detector may use (e.g., factor in) or exclude (e.g., factor out) a force of gravity in the information reported by the motion detector. The motion detector may exclude the force of gravity to report movement related to movement of restraint device 100 only. In various embodiments, the motion detector may also implement one or more filters configured to decrease sensitivity and/or increase accuracy of detecting movement of restraint device 100.

The motion detector may comprise one or more components configured to perform the functions of a motion detector, such as, for example, an acceleration sensor, a vibration sensor, a shock sensor, a tilt sensor, a rotation sensor, or the like. For example, the motion detector may comprise an accelerometer, a gyroscope, a magnetometer, and/or any other sensor or detector configured to detect motion and movement.

A gyroscope measures orientation and angular velocity. A gyroscope may measure the angular rate of rotational movement about one or more axes. A gyroscope may measure complex motion accurately in multiple dimensions, tracking the position and rotation of a moving object (e.g., restraint device 100). A gyroscope may detect motion in accordance with a coordinate system. A gyroscope may detect motion in accordance with a Cartesian coordinate system. A gyroscope may detect motion or a movement along one or more axes of a coordinate system.

An accelerometer detects acceleration. Detecting acceleration may include detecting a change in speed (e.g., velocity) over time and/or a change in direction over time. An accelerometer may detect the static and dynamic forces of acceleration. An accelerometer may detect acceleration of the object (e.g., restraint device 100) that holds (e.g., contains, connected to) the accelerometer (e.g., dynamic acceleration) and acceleration due to the force of gravity (e.g., static acceleration). In other words, an accelerometer may detect the dynamic translational acceleration of the object to which the accelerometer is coupled and the static force of gravity acting on the object.

In various embodiments, sensor 110 may comprise a location detector. The location detector may be configured to detect (e.g., detect, capture, measure, receive, etc.) a location of restraint device 100. The location detector may comprise software and/or hardware components. For example, the location detector may comprise an onboard global positioning system (GPS) which provides location (e.g., coordinates) of restraint device 100. The location detector may also comprise a compass which provides a direction of view or movement of restraint device 100, and/or an accelerometer which may detect a speed and/or acceleration of movement of restraint device 100. Collectively, the information collected by the location detector may be referred to as "location information."

In various embodiments, sensor 110 may comprise an audio input module. The audio input module may comprise hardware and/or software configured to detect (e.g., detect, capture, measure, receive, etc.) an audio input. The audio input module may be configured to receive an audio input (e.g., human speech, gunshot, noises, etc.) and store the audio input in memory, output the audio input as the audio output, and/or analyze or perform operations on the audio input. Outputting the audio input as the audio output may include changing one or more audio characteristics of the audio input, such as, for example, amplifying the audio input. Amplification may be achieved using any suitable software or hardware amplification technique.

In various embodiments, restraint device 100 may comprise an output interface 120. Output interface 120 may be in electronic communication with sensor 110. Output interface 120 may be configured to receive the biometric information from sensor 110. Output interface 120 may comprise one or more hardware and/or software components. In various embodiments, output interface 120 may comprise one or more of a processing circuit, a memory, a communications module, a user interface, a pressure modulator, a connecting member modulator, and/or the like, as discussed further herein.

In various embodiments, the biometric information received by output interface 120 may include one or more of a heart rate, a skin temperature, a blood oxygen saturation level, and/or the like. The biometric information may also comprise device information such as a pressure, a movement, a location information, an audio input, and/or the like. The biometric information may also comprise status information such as a timestamp of the device being locked (e.g., restraint engaged), a timestamp of the device being unlocked (e.g., restraint disengaged), chain of custody data including credentials of a law enforcement officer, security personnel, or the like assigned to the restraint device or receiving custody of the human restrained by the restraint device, and/or the like.

Output interface 120 may be configured to compare the biometric information to alert criteria. Output interface 120 may be configured to generate an alert based on the comparison. The alert criteria may comprise thresholds, ranges, low values, high values, and/or the like configured to be compared against the biometric information.

For example, the alert criteria may comprise a heart rate threshold. The heart rate threshold may define a low heart rate threshold, a high heart rate threshold, a heart rate range, and/or the like. In response to the biometric information comprising a heart rate outside the heart rate threshold (e.g., lower than the low heart rate threshold, higher than the high heart rate threshold, outside an acceptable heart rate range, inside an alert heart rate range, etc.), output interface 120 may generate an alert.

As a further example, the alert criteria may comprise a skin temperature threshold. The skin temperature threshold may define a high skin temperature threshold (e.g., a skin temperature associated with excited delirium), a skin temperature range threshold, and/or the like. In response to the biometric information comprising a skin temperature outside the skin temperature threshold (e.g., higher than the high skin temperature threshold, outside an acceptable skin temperature range, inside an alert skin temperature range, etc.), output interface 120 may generate an alert.

As a further example, the alert criteria may comprise a blood oxygen saturation level threshold. The blood oxygen saturation level threshold may define a low blood oxygen saturation level threshold, a blood oxygen saturation level range threshold, and/or the like. In response to the biometric information comprising a blood oxygen saturation level outside the blood oxygen saturation level threshold (e.g., lower than the low blood oxygen saturation level threshold, outside an acceptable blood oxygen saturation level range, inside an alert blood oxygen saturation level range, a blood oxygen saturation level indicating positional asphyxia, etc.), output interface 120 may generate an alert.

As a further example, the alert criteria may comprise a pressure threshold. The pressure threshold may define a high pressure threshold, a low pressure threshold, a pressure range threshold, or the like. In response to the biometric information comprising a pressure level outside the pressure threshold (e.g., lower than the low pressure threshold, higher than the high pressure threshold, outside an acceptable pressure range, inside an alert pressure range, etc.), output interface 120 may generate an alert.

As a further example, the alert criteria may comprise an identified movement. The identified movement may comprise a movement speed (e.g., a high movement speed, a movement speed range, etc.), a movement direction, a movement pattern, and/or the like. In response to the biometric information comprising a movement matching, within, or outside the identified movement output interface 120 may generate an alert.

As a further example, the alert criteria may comprise an identified location. The identified location may comprise a geographical area, an exclusion area, a safe zone, a distance, and/or the like. In response to the biometric information comprising a location information matching, within, or outside the identified location output interface 120 may generate an alert.

As a further example, the alert criteria may comprise an identified audio. The identified audio may comprise an audio detection, an audio command, a gunshot detection, and/or the like. In response to the biometric information comprise an audio input matching, meeting, or the like the identified audio output interface 120 may generate an alert.

The alert may be generated to comprise the biometric information, the alert criteria, and/or any other suitable or desired information, instructions, and/or the like. Output interface 120 may be configured to output the alert. For example, in some embodiments the alert may comprise an audio output and/or a visual output. In that respect, restraint device 100 may output a sound, activate a light, activate a visual display, and/or the like based on the alert.

Output interface 120 may be configured to transmit the alert. For example, in some embodiments the alert may be transmitted to an electronic device. The alert may comprise data regarding the biometric information, the alert criteria, and/or the like. The alert may comprise instructions to perform an operation based on the alert. For example, the electronic device may comprise a camera, such as a body-worn camera, a vehicle mounted camera, or the like. The alert may comprise instructions for the camera to activate to record audio and/or visual data. As a further example, the electronic device may comprise an electronic weapon, such as a less-lethal weapon (e.g., conducted electrical weapon, etc.). The alert may comprise instructions for the electronic weapon to deactivate a safety.

Output interface 120 may be configured to modulate a restraint device property based on the alert. The restraint device property may be associated with one or more components or properties of restraint device 100, such as a pressure modulator, a connecting member modulator, or the like, as discussed further herein. Output interface 120 may modulate the restraint device property by adjusting a pressure (e.g., decreasing a pressure, increasing a pressure, etc.), adjusting a length of a connecting member (e.g., increasing a length, decreasing a length, etc.), and/or the like, as discussed further herein.

In various embodiments, restraint device 100 may comprise one or more physically separate bodies. For example, restraint device 100 may comprise a body (e.g., a primary body, a restraint body, etc.) and an external housing. The body may comprise a restraint member configured to restrain a body part of a human. The external housing may comprise one or more other components of restraint device 100. For example, one or more of sensor 110 and/or output interface 120 may be located in the external housing. The external housing may affix to a person, such as, for example, via an accessory belt, as an article of clothing, and/or the like.

Figure 1B:
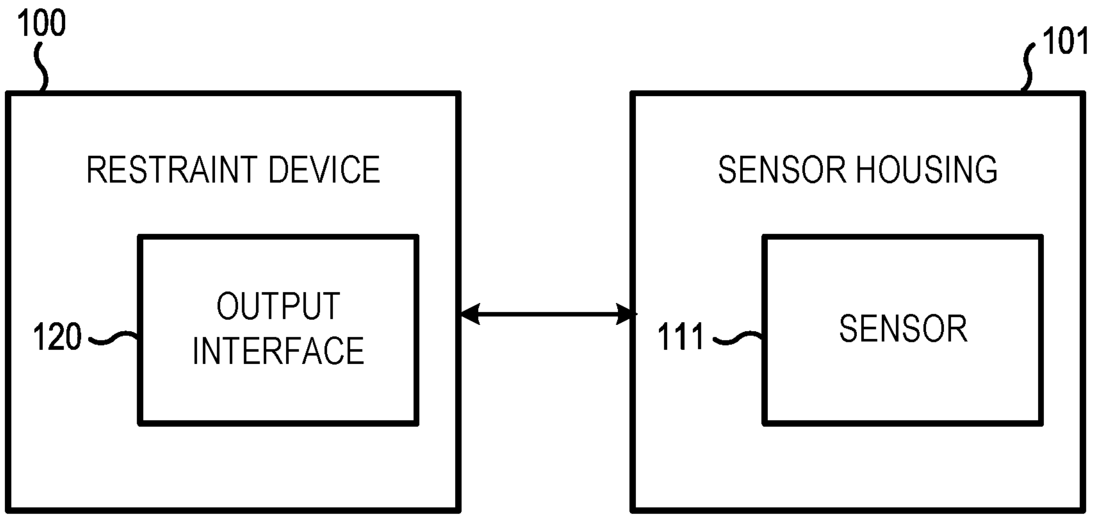
FIG. 1B is a block diagram illustrating a restraint device in communication with a sensor housing, in accordance with various embodiments.

For example, in accordance with various embodiments and with reference to FIG. 1B, restraint device 100 may be in electronic communication with a sensor housing 101. Restraint device 100 may comprise output interface 120. Sensor housing 101 may comprise sensor 111. Output interface 120 may receive biometric information from sensor 111. In that regard, sensor housing 101 may be positioned on a human such that sensor 111 may detect the biometric information from the human, while restraint device 100 is positioned on the human to restrain the human.

Figure 2:
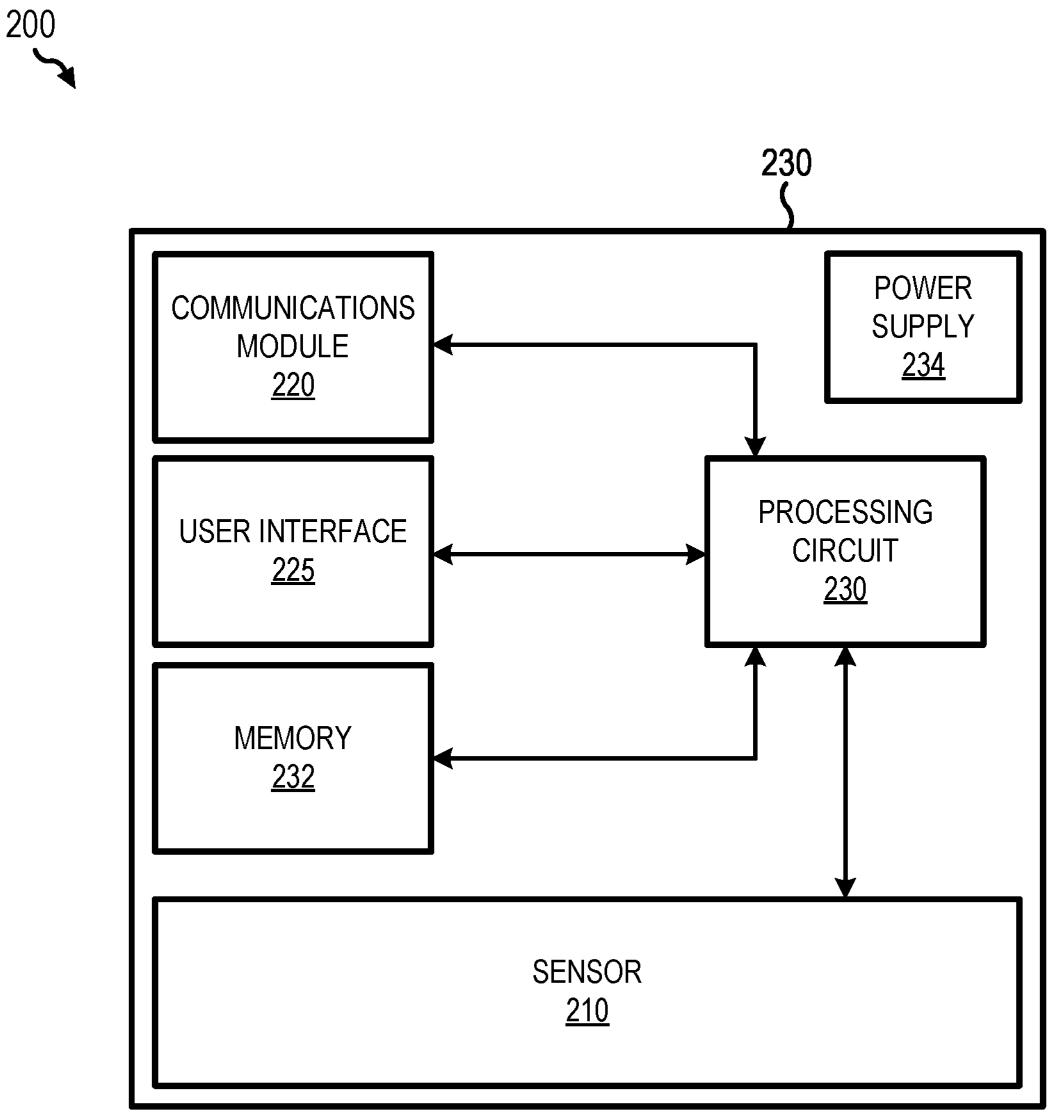
FIG. 2 is a block diagram of a restraint device, in accordance with various embodiments.

In various embodiments, and with reference to FIG. 2, a restraint device 200 is disclosed. Restraint device 200 may be similar to, or share components with, any other restraint device disclosed herein. Restraint device 200 may comprise a sensor 210, a processing circuit 230, a memory 232, a communications module 220, a user interface 225, and/or a power supply 234.

Sensor 210 may be similar to sensor 110, with brief reference to FIG. 1A. Sensor 210 may be configured to detect biometric information, as previously discussed.

In various embodiments, processing circuit 230 may be similar to any other processing unit, processing circuit, processor, or the like described herein. Processing unit 230 may comprise any circuitry, electrical components, electronic components, software, and/or the like configured to perform various operations and functions discussed herein. Processing circuit 230 may be configured to perform one or more operations of an output interface, as discussed further herein. For example, processing circuit 230 may be configured to receive biometric information, compare biometric information to alert criteria, generate alerts, transmit alerts, and/or the like. Processing circuit 230 may be in electronic communication with sensor 210, communications module 220, user interface 225, and/or memory 232.

In various embodiments, memory 232 may be similar to any other memory, storage device, data structure, database, or the like described herein. Memory 232 may comprise a memory unit capable of storing and maintaining data. For example, memory 232 may store the alert criteria. Memory 232 may also store detected biometric information, generated alerts, and/or the like. Memory 232 may also store instructions for execution by processing circuit 230.

In various embodiments, communications module 220 may be similar to, or comprise similar components with, any other communication unit, short-range communication unit, long-range communication unit, or the like disclosed here. Communications module 220 may enable electronic communications between devices and systems. Communications module 220 may enable communications over a network. For example, communications module 220 may include a modem, a network interface (such as an Ethernet card), a communications port, or the like. Data may be transferred via communications module 220 in the form of signals which may be electronic, electromagnetic, optical, or other signals capable of being transmitted or received by a communications unit. Communications module 220 may be configured to communicate via any wired protocol, wireless protocol, or other protocol capable of transmitting information via a wired or wireless connection. In various embodiments, communications module 220 may be configured to enable short-range communications between devices. In various embodiments, communications module 220 may be configured to enable long-range communications between devices or systems. In various embodiments, communications module 220 may be configured to enable both short-range communications and long-range communications. Communications module 220 may be configured to perform one or more operations of an output interface, as discussed further herein. For example, communications module 220 may be configured to transmit alerts and/or the like.

In various embodiments, user interface 225 may be configured to allow a user to interact with restraint device 200. User interface 225 may comprise software, a mobile application, an interface, or the like. User interface 225 may comprise a graphical user interface configured to allow the user to input and view data. User interface 225 may comprise a physical interface such as a keypad, a number pad, a physical lock (e.g., a lock requiring a key to open), or the like. User interface 225 may comprise a biometric reader, as discussed further herein. User interface 225 may comprise an interface configured to receive electronic signals, such as, for example, a BLUETOOTH® receiver, an NFC receiver, or the like. User interface 225 may comprise an audio output module (e.g., a speaker), an audio input module (e.g., a microphone), a light emitting module (e.g., LED lights, a flashlight, etc.), and/or the like.

In various embodiments, power supply 234 may be configured to provide power to various components of restraint device 200. For example, power supply 234 may provide energy for operating the electronic and/or electrical components (e.g., parts, subsystems, circuits, etc.) of restraint device 200. Power supply 234 may be electrically coupled to sensor 210, processing circuit 230, memory 232, communications module 220, and/or user interface 225. Power supply 234 may provide electrical power. Providing electrical power may include providing a current at a voltage. The energy of power supply 234 may be renewable or exhaustible, and/or replaceable. For example, power supply 234 may comprise one or more rechargeable or disposable batteries. In various embodiments, the energy from power supply 234 may be converted from one form (e.g., electrical, magnetic, thermal) to another form to perform the functions of a system.

Figure 3:
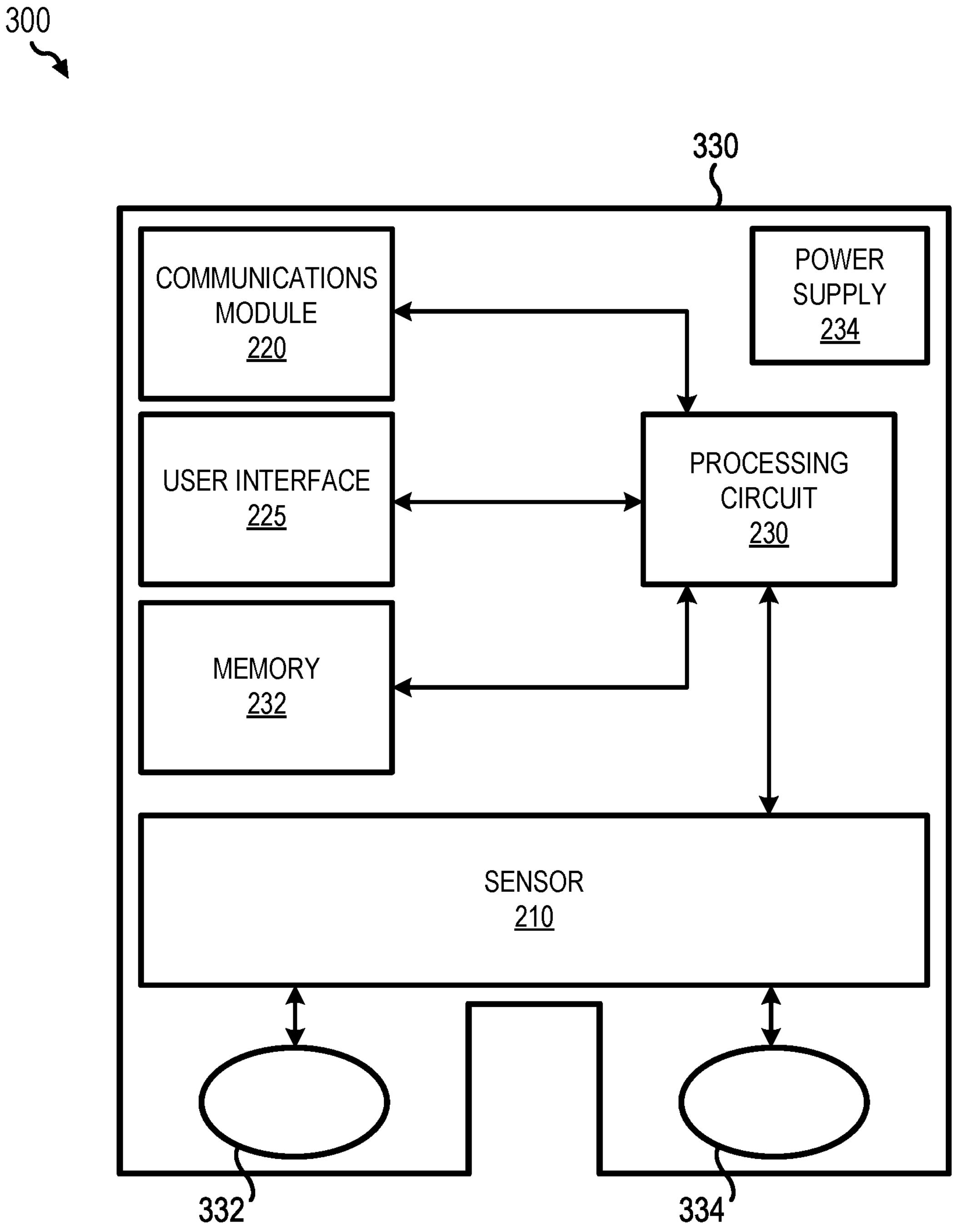
FIG. 3 is a block diagram of a restraint device comprising restraint openings, in accordance with various embodiments.

In various embodiments, and with reference to FIG. 3, a restraint device 300 is disclosed. Restraint device 300 may be similar to, or share components with, any other restraint device disclosed herein. Restraint device 300 may comprise a sensor 210, a processing circuit 230, a memory 232, a communications module 220, a user interface 225, and/or a power supply 234. Sensor 210, processing circuit 230, memory 232, communications module 220, user interface 225, and/or power supply 234 were previously discussed with reference to FIG. 2.

Restraint device 300 may comprise a body 330 defining a first restraint opening 332 and/or a second restraint opening 334. Restraint device 300 may alternatively comprise a single restraint opening, or a plurality of restraint openings. Each restraint opening 332, 334 may be sized and shaped to receive a body part of a human to at least partially restrain the human. For example, in response to restraint device 300 comprising handcuffs, restraint openings 332, 334 may be sized and shaped to receive hands and/or wrists of a human. As a further example, in response to restraint device 300 comprising leg irons, restraint openings 332, 334 may be sized and shaped to receive feet, ankles, and/or legs of a human. Each restraint opening 332, 334 may be adjustable to securely receive and at least partially restrain the human.

In various embodiments, sensor 210 may be disposed proximate restraint openings 332, 334. In some embodiments, sensor 210 may be in communication with restraint openings 332, 334 such that sensor 210 may be located proximate a body part of a human disposed within restraint opening 332, 334. Sensor 210 may be located in any suitable location proximate restraint openings 332, 334 to allow sensor 210 to gather biometric information. In various embodiments, sensor 210 may be in electronic communication with at least one of restraint openings 332, 334.

In some embodiments, sensor 210 may be disposed proximate one of restraint opening 332 or restraint opening 334. Sensor 210 may be located proximate a body part of a human disposed within the one of restraint opening 332 or restraint opening 334. In that respect, sensor 210 may gather biometric information only from the body part of the human disposed within the one of restraint opening 332 or restraint opening 334, and not from the other of the restraint opening 332 or restraint opening 334.

In some embodiments, sensor 210 may be disposed proximate each of restraint opening 332 or restraint opening 334. Sensor 210 may be located proximate a first body part disposed within restraint opening 332, and sensor 210 may be located proximate a second body part disposed within restraint opening 334. In that respect, sensor 210 may gather biometric information from the first body part disposed within restraint opening 332 and the second body part disposed within restraint opening 334. In various embodiments, the biometric information gathered from the first body part may be different from the biometric information gathered from the second body part. For example, sensor 210 may gather a first biometric information from the first body part and a second biometric information from the second body part. The first biometric information may be different from the second biometric information. In various embodiments, the biometric information gathered from the first body part may be common with the biometric information gathered from the second body part. For example, sensor 210 may gather data from the first body part (e.g., first body part data) and the second body part (e.g., second body part data), and the gathered data may collectively form (e.g., generate) the biometric information. As a further example, sensor 210 may gather the biometric information based on signals and/or data received from the first body part and the second body part.

For example, in various embodiments sensor 210 may comprise an electrical sensor (e.g., ECG sensor) configured to measure heart rate. The electrical sensor may comprise a plurality of sensors including a first sensor (e.g., a first conductive lead, a first electrode, etc.) and a second sensor (e.g., a second conductive lead, a second electrode, etc.). The first sensor may be disposed proximate restraint opening 332 and the second sensor may be disposed proximate restraint opening 334. The first sensor may be electrically coupled to the second sensor. The first sensor may contact or be in proximity with a first body part inserted into restraint opening 332. The second sensor may contact or be in proximity with a second body part inserted into restraint opening 332. The first sensor may detect or receive a first biometric signal from the first body part. The second sensor may detect or receive a second biometric signal from the second body part. Sensor 210 may measure a heart rate based on the first biometric signal and the second biometric signal.

Figure 4:
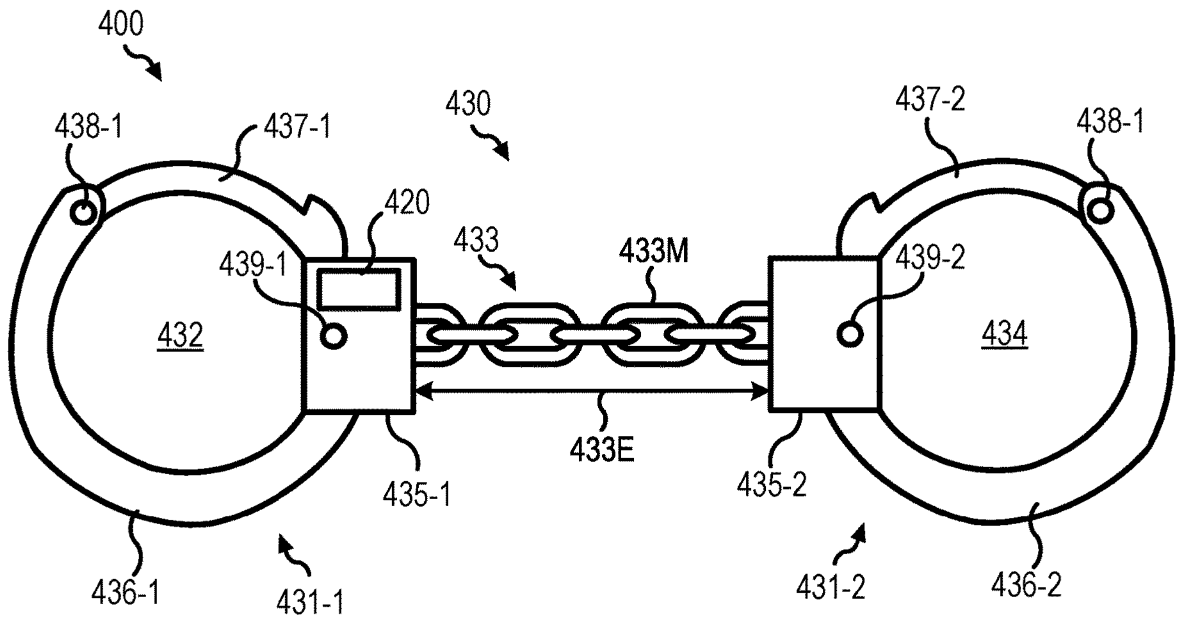
FIG. 4 illustrates a top view of a restraint device, in accordance with various embodiments.

In various embodiments, and with reference to FIG. 4, a restraint device 400 is disclosed. Restraint device 400 may be similar to, or share components with, any other restraint device disclosed herein. Although depicted as handcuffs, restraint device 400 may comprise various form factors, including any other restraint device disclosed herein.

Restraint device 400 may comprise a body 430 defining a first restraint 431-1 (e.g., a first member, a first restraint member, etc.) and a second restraint 431-2 (e.g., a second member, a second restraint member, etc.). First restraint 431-1 may be coupled to second restraint 431-2 by a connecting member 433. The coupling may include mechanical coupling, electrical coupling, and/or electronic coupling. As depicted in FIG. 4, in some embodiments connecting member 433 includes a mechanical connecting member 433M and an electrical connecting member 433E. Connecting member 433 may define a length (e.g., a distance) between each restraint member 431-1, 431-2. In other embodiments, first restraint 431-1 may be directly coupled to second restraint 431-2 without a connecting member.

Restraints 431-1, 431-2 may be similar to any other restraint openings discussed herein. Each restraint 431-1, 431-2 may be sized and shaped to receive a body part of a human to at least partially restrain the human. For example, restraints 431-1, 431-2 may be sized and shaped to receive hands and/or wrists of a human. Each restraint 431-1, 431-2 may be adjustable to securely receive and at least partially restrain the human.

First restraint 431-1 may comprise a base 435-1. Base 435-1 may be configured to house mechanical, electronic, and/or electrical components of restraint device 400. For example, base 435-1 may house a sensor and/or an output interface. As a further example, base 435-1 may house a processing circuit, a memory, a communications module, a power supply, and/or a sensor. The various components may be similar to other sensors, output interfaces, processing circuits, memories, communications modules, power supplies, and/or the like disclosed herein.

Base 435-1 may also comprise a user interface 420. User interface 420 may be similar to any other user interface, output interface, or the like disclosed herein.

Base 435-1 may also comprise a mechanical lock 439-1. Mechanical lock 439-1 may be configured to position and/or lock restraint 431-1 into place, as discussed further herein. Although referred to as a mechanical lock, lock 439-1 may also comprise an electronic lock, or any other suitable locking mechanism.

First restraint 431-1 may comprise a stationary member 436-1 extending from a first portion of base 435-1. First restraint 431-1 may comprise a translatable member 437-1 extending from a pivot point 438-1 of stationary member 436-1. Translatable member 437-1 may be configured to secure and couple to base 435-1 at a second portion of base 435-1. A portion of translatable member 437-1 may be received within base 435-1. Mechanical lock 439-1 may engage the portion of translatable member 437-1 to lock restraint 431-1 into place, and disengage from the portion of translatable member 437-1 to release restraint 431-1.

Base 435-1, stationary member 436-1, and translatable member 437-1 may define a restraint opening 432. Restraint opening 432 may be configured to receive a body part of a human (e.g., wrist, hand, etc.) to at least partially restrain the human. Translatable member 437-1 may be adjusted to increase or decrease the size of restraint opening 432. For example, translatable member 437-1 may be manually adjusted by inserting a greater portion of translatable member 437-1 into base 435-1 to decrease the area of restraint opening 432, or by removing a portion of translatable member 437-1 from base 435-1 to increase the area of restraint opening 432. In various embodiments, base 435-1 may house an actuator, a switch, or the like (e.g., a pressure modulator) configured to adjust the area of restraint opening 432 based on instructions from a processing circuit. For example, a first instruction may cause the actuator, the switch, or the like to decrease the area of restraint opening 432 by causing a greater portion of translatable member 437-1 to be inserted into base 435-1 (e.g., translated into base 435-1). As a further example, a second instruction may cause the actuator, the switch, or the like to increase the area of restraint opening 432 by causing a greater portion of translatable member 437-1 to be removed from base 435-1 (e.g., translated away from base 435-1). In that respect, the area of restraint opening 432 may be adjusted by the processing circuit based on an alert.

In various embodiments, base 435-1 may house a connecting member modulator. The connecting member modulator may be configured to increase or decrease a length of connecting member 433. For example, the connecting member modulator may comprise an actuator, a switch, a wheel, or the like. The connecting member modulator may decrease a length of connecting member 433 by forcing a portion of connecting member 433 into base 435-1. The connecting member modulator may increase a length of connecting member 433 by releasing a portion of connecting member 433 that was previously stored within base 435-1.

In various embodiments, base 435-1 may house a sensor. The sensor may be configured to detect biometric information from a human at least partially restrained by first restraint 431-1. The sensor may be similar to any other sensor described herein, and may detect biometric information as discussed herein. Base 435-1 may position the sensor proximate to the appendage of the human inserted into first restraint 431-1. Base 435-1 may position the sensor in contact with the appendage of the human inserted into first restraint 431-1.

Second restraint 431-2 may be similar to first restraint 431-1. Second restraint 431-2 may comprise a base 435-2. Base 435-2 may be configured to house mechanical, electronic, and/or electrical components of restraint device 400. For example, base 435-2 may house a sensor and/or an output interface. As a further example, base 435-2 may house a processing circuit, a memory, a communications module, a power supply, and/or a sensor. The various components may be similar to other sensors, output interfaces, processing circuits, memories, communications modules, power supplies, and/or the like disclosed herein.

Base 435-2 may also comprise a user interface. The user interface may be similar to any other user interface, output interface, or the like disclosed herein.

In various embodiments, only one of base 435-1 or base 435-2 house electronic components and/or a user interface. In other embodiments, each of base 435-1 and base 435-2 house electronic components and/or a user interface.

Base 435-2 may also comprise a mechanical lock 439-2. Mechanical lock 439-2 may be configured to position and/or lock restraint 431-2 into place, as discussed further herein. Although referred to as a mechanical lock, lock 439-2 may also comprise an electronic lock, or any other suitable locking mechanism.

Second restraint 431-2 may comprise a stationary member 436-2 extending from a first portion of base 435-2. Second restraint 431-2 may comprise a translatable member 437-2 extending from a pivot point 438-2 of stationary member 436-2. Translatable member 437-2 may be configured to secure and couple to base 435-2 at a second portion of base 435-2. A portion of translatable member 437-2 may be received within base 435-2. Mechanical lock 439-2 may engage the portion of translatable member 437-2 to lock second restraint 431-2 into place, and disengage from the portion of translatable member 437-2 to release second restraint 431-2.

Base 435-2, stationary member 436-2, and translatable member 437-2 may define a restraint opening 434. Restraint opening 434 may be configured to receive a body part of a human (e.g., wrist, hand, etc.) to at least partially restrain the human. Translatable member 437-2 may be adjusted to increase or decrease the area of restraint opening 434. For example, translatable member 437-2 may be manually adjusted by inserting a greater portion of translatable member 437-2 into base 435-2 to decrease the area of restraint opening 434, or by removing a portion of translatable member 437-2 from base 435-2 to increase the area of restraint opening 434. In various embodiments, base 435-2 may house an actuator, a switch, or the like (e.g., a pressure modulator) configured to adjust the area of restraint opening 434 based on instructions from a processing circuit. For example, a first instruction may cause the actuator, the switch, or the like to decrease the area of restraint opening 434 by causing a greater portion of translatable member 437-2 to be inserted into base 435-2 (e.g., translated into base 435-2). As a further example, a second instruction may cause the actuator, the switch, or the like to increase the area of restraint opening 434 by causing a greater portion of translatable member 437-2 to be removed from base 435-2 (e.g., translated away from base 435-2). In that respect, the area of restraint opening 434 may be adjusted by the processing circuit based on an alert.

In various embodiments, a first instruction may cause each of restraint opening 432 and restraint opening 434 to decrease in area. For example, the first instruction may cause a greater portion of translatable member 437-1 to be inserted into base 435-1 (e.g., translated into base 435-1) to decrease the open area of restraint opening 432. The first instruction may also cause a greater portion of translatable member 437-2 to be inserted into base 435-2 (e.g., translated into base 435-2) to decrease the open area of restraint opening 434. In various embodiments, a second instruction may cause each of restraint opening 432 and restraint opening 434 to increase in area. For example, the second instruction may cause a greater portion of translatable member 437-1 to be removed from base 435-1 (e.g., translated away base 435-1) to increase the open area of restraint opening 432. The second instruction may also cause a greater portion of translatable member 437-2 to be removed from base 435-2 (e.g., translated away from base 435-2) to increase the open area of restraint opening 434.

In various embodiments, instructions may independently cause restraint opening 432 and/or restraint opening 434 to vary in area. For example, a first instruction may cause only restraint opening 432 to vary (e.g., increase or decrease) in open area, and a second instruction may cause only restraint opening 434 to vary (e.g., increase or decrease) in open area.

In various embodiments, base 435-2 may house a connecting member modulator. The connecting member modulator may be configured to increase or decrease a length of connecting member 433. For example, the connecting member modulator may comprise an actuator, a switch, a wheel, or the like. The connecting member modulator may decrease a length of connecting member 433 by forcing a portion of connecting member 433 into base 435-2. The connecting member modulator may increase a length of connecting member 433 by releasing a portion of connecting member 433 that was previously stored within base 435-2.

In various embodiments, base 435-2 may house a sensor. The sensor may be configured to detect biometric information from a human at least partially restrained by second restraint 431-2. The sensor may be similar to any other sensor described herein, and may detect biometric information as discussed herein. Base 435-2 may position the sensor proximate to the appendage of the human inserted into second restraint 431-2. Base 435-2 may position the sensor in contact with the appendage of the human inserted into second restraint 431-2.

In various embodiments, restraint device 400 may comprise an electrical sensor (e.g., ECG sensor) configured to measure heart rate. The electrical sensor may comprise a plurality of sensors available at first restraint 431-1 and/or second restraint 431-2. For example, the electrical sensor may comprise a plurality of sensors including a first sensor (e.g., a first conductive lead, a first electrode, etc.) available at first restraint 431-1 and a second sensor (e.g., a second conductive lead, a second electrode, etc.) available at second restraint 431-2. The first sensor may be disposed proximate restraint opening 432 and the second sensor may be disposed proximate restraint opening 434. The first sensor may be electrically coupled to the second sensor. For example, the first sensor may be electrically coupled to the second sensor via electrical connecting member 433E.

The first sensor may be positioned at first restraint 431-1 to contact or be in proximity with a first body part inserted into restraint opening 432. The second sensor may be positioned at second restraint 431-2 to contact or be in proximity with a second body part inserted into restraint opening 434. The first sensor may detect or receive a first biometric signal from the first body part. The second sensor may detect or receive a second biometric signal from the second body part. The sensor may measure a heart rate based on the first biometric signal and the second biometric signal.

Figure 5:
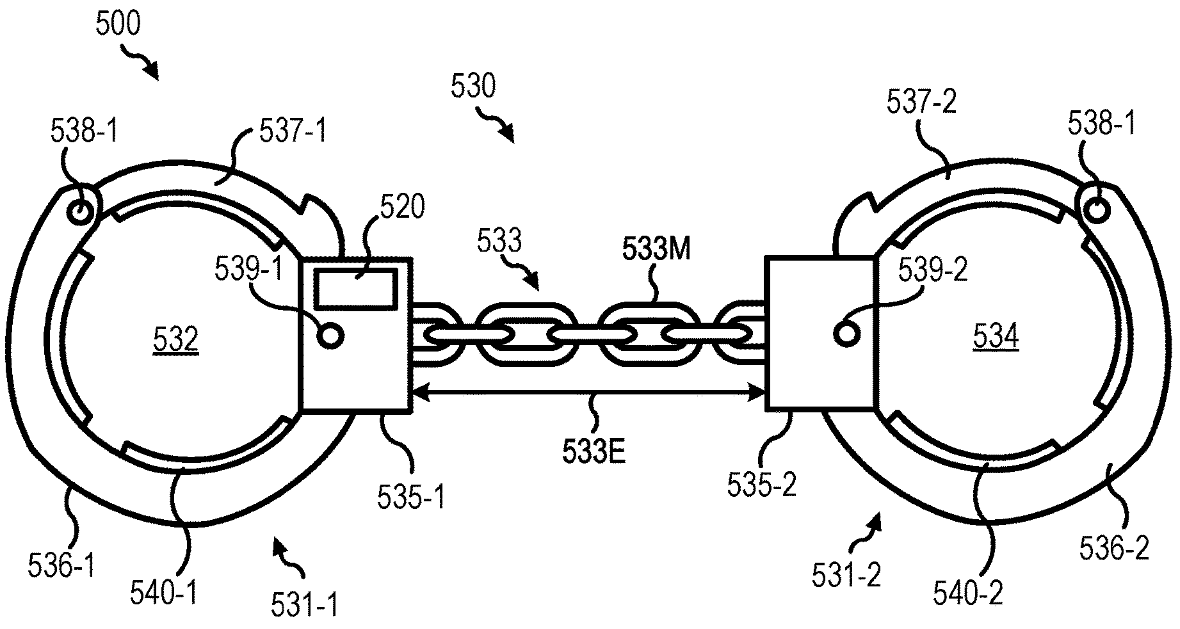
FIG. 5 illustrates a top view of a restraint device comprising a pressure modulator, in accordance with various embodiments.

In various embodiments, and with reference to FIG. 5, a restraint device 500 is disclosed. Restraint device 500 may be similar to, or share components with, any other restraint device disclosed herein.

Restraint device 500 may comprise a body 530 defining a first restraint 531-1 (e.g., a first member, a first restraint member, etc.) and a second restraint 531-2 (e.g., a second member, a second restraint member, etc.). Body 500 may be similar to body 400, first restraint 531-1 may be similar to first restraint 431-1, and second restraint 531-2 may be similar to second restraint 531-2, with brief reference to FIG. 4. First restraint 531-1 may be coupled to second restraint 531-2 by a connecting member 533. The coupling may include mechanical coupling, electrical coupling, and/or electronic coupling. As depicted in FIG. 5, connecting member 533 includes a mechanical connecting member 533M and an electrical connecting member 533E. Connecting member 533 may be similar to connecting member 433, with brief reference to FIG. 4. Connecting member 533 may define a length (e.g., a distance) between each restraint member 531-1, 531-2.

Restraints 531-1, 531-2 may be similar to any other restraint openings discussed herein. Each restraint 531-1, 531-2 may be sized and shaped to receive a body part of a human to at least partially restrain the human. For example, restraints 531-1, 531-2 may be sized and shaped to receive hands and/or wrists of a human. Each restraint 531-1, 531-2 may be adjustable to securely receive and at least partially restrain the human.

First restraint 531-1 may comprise a base 535-1. Base 535-1 may be configured to house mechanical, electronic, and/or electrical components of restraint device 500. For example, base 535-1 may house a sensor and/or an output interface. As a further example, base 535-1 may house a processing circuit, a memory, a communications module, a power supply, and/or a sensor. The various components may be similar to other sensors, output interfaces, processing circuits, memories, communications modules, power supplies, and/or the like disclosed herein.

Base 535-1 may also comprise a user interface 520. User interface 520 may be similar to any other user interface, output interface, or the like disclosed herein.

Base 535-1 may also comprise a mechanical lock 539-1. Mechanical lock 539-1 may be configured to position and/or lock restraint 531-1 into place, as discussed further herein. Although referred to as a mechanical lock, lock 539-1 may also comprise an electronic lock, or any other suitable locking mechanism.

First restraint 531-1 may comprise a stationary member 536-1 extending from a first portion of base 535-1. First restraint 531-1 may comprise a translatable member 537-1 extending from a pivot point 538-1 of stationary member 536-1. Translatable member 537-1 may be configured to secure and couple to base 535-1 at a second portion of base 535-1. A portion of translatable member 537-1 may be received within base 535-1. Mechanical lock 539-1 may engage the portion of translatable member 537-1 to lock restraint 531-1 into place, and disengage from the portion of translatable member 537-1 to release restraint 531-1.

Base 535-1, stationary member 536-1, and translatable member 537-1 may define a restraint opening 532. Restraint opening 532 may be configured to receive a body part of a human (e.g., wrist, hand, etc.) to at least partially restrain the human. Translatable member 537-1 may be adjusted to increase or decrease the area of restraint opening 532. For example, translatable member 537-1 may be manually adjusted by inserting a greater portion of translatable member 537-1 into base 535-1 to decrease the area of restraint opening 532, or by removing a portion of translatable member 537-1 from base 535-1 to increase the area of restraint opening 532. In various embodiments, base 535-1 may house an actuator, a switch, or the like (e.g., a pressure modulator) configured to adjust the area of restraint opening 532 based on instructions from a processing circuit. For example, a first instruction may cause the actuator, the switch, or the like to decrease the area of restraint opening 532 by causing a greater portion of translatable member 537-1 to be inserted into base 535-1 (e.g., translated into base 535-1). As a further example, a second instruction may cause the actuator, the switch, or the like to increase the area of restraint opening 532 by causing a greater portion of translatable member 537-1 to be removed from base 535-1 (e.g., translated away from base 535-1). In that respect, the area of restraint opening 532 may be adjusted by the processing circuit based on an alert.

In various embodiments, first restraint 531-1 may comprise a pressure modulator 540-1. Pressure modulator 540-1 may extend radially inward from one or more of base 535-1, stationary member 536-1, and translatable member 537-1. Pressure modulator 540-1 may comprise one or more separate pressure modulators. Pressure modulator 540-1 may be configured to increase and/or decrease in size. An increase in size of pressure modulator 540-1 may decrease an area (e.g., circumference) of restraint opening 532. An increase in size of pressure modulator 540-1 may refer to an expansion or movement of pressure modulator 540-1 in a radially inward direction towards a center of restraint opening 532. A decrease in size of pressure modulator 540-1 may increase an area (e.g., circumference) of restraint opening 532. A decrease in size of pressure modulator 540-1 may refer to contraction or movement of pressure modulator 540-1 in a radially outward direction from a center of restraint opening 532. Pressure modulator 540-1 may adjust in size based on any suitable technique. For example, pressure modulator 540-1 may comprise an airbag configured to receive air or gas to increase in size and emit air or gas to decrease in size.

In other embodiments, pressure modulator 540-1 may adjust in size based on mechanical, chemical, and/or electrical modulation.

Pressure modulator 540-1 may adjust in size based on instructions from a processing circuit. For example, a first instruction may cause pressure modulator 540-1 to increase in size to decrease the area of restraint opening 532. As a further example, a second instruction may cause pressure modulator 540-1 to decrease in size to increase the area of restraint opening 532. In that respect, pressure modulator 540-1 may adjust in size based on an alert.

In various embodiments, base 535-1 may house a connecting member modulator. The connecting member modulator may be configured to increase or decrease a length of connecting member 533. For example, the connecting member modulator may comprise an actuator, a switch, a wheel, or the like. The connecting member modulator may decrease a length of connecting member 533 by forcing a portion of connecting member 533 into base 535-1. The connecting member modulator may increase a length of connecting member 533 by releasing a portion of connecting member 533 that was previously stored within base 535-1.

In various embodiments, base 535-1 may house a sensor. The sensor may be configured to detect biometric information from a human at least partially restrained by first restraint 531-1. The sensor may be similar to any other sensor described herein, and may detect biometric information as discussed herein.

Second restraint 531-2 may be similar to first restraint 531-1. Second restraint 531-2 may comprise a base 535-2. Base 535-2 may be configured to house mechanical, electronic, and/or electrical components of restraint device 500. For example, base 535-2 may house a sensor and/or an output interface. As a further example, base 535-2 may house a processing circuit, a memory, a communications module, a power supply, and/or a sensor. The various components may be similar to other sensors, output interfaces, processing circuits, memories, communications modules, power supplies, and/or the like disclosed herein.

Base 535-2 may also comprise a user interface. The user interface may be similar to any other user interface, output interface, or the like disclosed herein.

In various embodiments, only one of base 535-1 or base 535-2 house electronic components and/or a user interface. In other embodiments, each of base 535-1 and base 535-2 house electronic components and/or a user interface.

Base 535-2 may also comprise a mechanical lock 539-2. Mechanical lock 539-2 may be configured to position and/or lock restraint 531-2 into place, as discussed further herein. Although referred to as a mechanical lock, lock 539-2 may also comprise an electronic lock, or any other suitable locking mechanism.

Second restraint 531-2 may comprise a stationary member 536-2 extending from a first portion of base 535-2. Second restraint 531-2 may comprise a translatable member 537-2 extending from a pivot point 538-2 of stationary member 536-2. Translatable member 537-2 may be configured to secure and couple to base 535-2 at a second portion of base 535-2. A portion of translatable member 537-2 may be received within base 535-2. Mechanical lock 539-2 may engage the portion of translatable member 537-2 to lock second restraint 531-2 into place, and disengage from the portion of translatable member 537-2 to release second restraint 531-2.

Base 535-2, stationary member 536-2, and translatable member 537-2 may define a restraint opening 534. Restraint opening 534 may be configured to receive a body part of a human (e.g., wrist, hand, etc.) to at least partially restrain the human. Translatable member 537-2 may be adjusted to increase or decrease the area of restraint opening 534. For example, translatable member 537-2 may be manually adjusted by inserting a greater portion of translatable member 537-2 into base 535-2 to decrease the area of restraint opening 534, or by removing a portion of translatable member 537-2 from base 535-2 to increase the area of restraint opening 534. In various embodiments, base 535-2 may house an actuator, a switch, or the like (e.g., a pressure modulator) configured to adjust the area of restraint opening 532 based on instructions from a processing circuit. For example, a first instruction may cause the actuator, the switch, or the like to decrease the area of restraint opening 534 by causing a greater portion of translatable member 537-2 to be inserted into base 535-2 (e.g., translated into base 535-2). As a further example, a second instruction may cause the actuator, the switch, or the like to increase the area of restraint opening 534 by causing a greater portion of translatable member 537-2 to be removed from base 535-2 (e.g., translated away from base 535-2). In that respect, the area of restraint opening 534 may be adjusted by the processing circuit based on an alert.

In various embodiments, second restraint 531-2 may comprise a pressure modulator 540-2. Pressure modulator 540-2 may extend radially inward from one or more of base 535-2, stationary member 536-2, and translatable member 537-2. Pressure modulator 540-2 may comprise one or more separate pressure modulators. Pressure modulator 540-2 may be configured to increase and/or decrease in size. An increase in size of pressure modulator 540-2 may decrease an area (e.g., circumference) of restraint opening 534. An increase in size of pressure modulator 540-2 may refer to an expansion or movement of pressure modulator 540-2 in a radially inward direction towards a center of restraint opening 534. A decrease in size of pressure modulator 540-2 may increase an area (e.g., circumference) of restraint opening 534. A decrease in size of pressure modulator 540-2 may refer to contraction or movement of pressure modulator 540-2 in a radially outward direction from a center of restraint opening 534. Pressure modulator 540-2 may adjust in size based on any suitable technique. For example, pressure modulator 540-2 may comprise an airbag configured to receive air or gas to increase in size and emit air or gas to decrease in size. In other embodiments, pressure modulator 540-2 may adjust in size based on mechanical, chemical, and/or electrical modulation.

Pressure modulator 540-2 may adjust in size based on instructions from a processing circuit. In that respect, pressure modulator 540-2 may adjust in size based on an alert. For example, a first instruction may cause pressure modulator 540-2 to increase in size to decrease the area of restraint opening 534. As a further example, a second instruction may cause pressure modulator 540-2 to decrease in size to increase the area of restraint opening 534. In that respect, pressure modulator 540-2 may adjust in size based on an alert.

In various embodiments, an instruction may cause each of pressure modulator 540-1 and pressure modulator 540-2 to change in size. For example, a first instruction may cause pressure modulator 540-1 to increase in size to decrease the area of restraint opening 532 and pressure modulator 540-2 to increase in size to decrease the area of restraint opening 534. As a further example, a second instruction may cause pressure modulator 540-1 to decrease in size to increase the area of restraint opening 532 and pressure modulator 540-2 to decrease in size to increase the area of restraint opening 534.

In various embodiments, instructions may independently cause pressure modulator 540-1 and/or pressure modulator 540-2 to change in size. For example, a first instruction may cause only pressure modulator 540-1 to change (e.g., increase or decrease) in size, and a second instruction may cause only pressure modulator 540-2 to change (e.g., increase or decrease) in size.

In various embodiments, base 535-2 may house a connecting member modulator. The connecting member modulator may be configured to increase or decrease a length of connecting member 533. For example, the connecting member modulator may comprise an actuator, a switch, a wheel, or the like. The connecting member modulator may decrease a length of connecting member 533 by forcing a portion of connecting member 533 into base 535-2. The connecting member modulator may increase a length of connecting member 533 by releasing a portion of connecting member 533 that was previously stored within base 535-2.

In various embodiments, base 535-2 may house a sensor. The sensor may be configured to detect biometric information from a human at least partially restrained by first restraint 531-2. The sensor may be similar to any other sensor described herein, and may detect biometric information as discussed herein.

In various embodiments, restraint device 500 may comprise an electrical sensor (e.g., ECG sensor) configured to measure heart rate. The electrical sensor may comprise a plurality of sensors available at first restraint 531-1 and/or second restraint 531-2. For example, the electrical sensor may comprise a plurality of sensors including a first sensor (e.g., a first conductive lead, a first electrode, etc.) available at first restraint 531-1 and a second sensor (e.g., a second conductive lead, a second electrode, etc.) available at second restraint 531-2. The first sensor may be disposed proximate restraint opening 532 and the second sensor may be disposed proximate restraint opening 534. The first sensor may be electrically coupled to the second sensor. For example, the first sensor may be electrically coupled to the second sensor via electrical connecting member 533E.

The first sensor may be positioned at first restraint 531-1 to contact or be in proximity with a first body part inserted into restraint opening 532. The second sensor may be positioned at second restraint 531-2 to contact or be in proximity with a second body part inserted into restraint opening 534. The first sensor may detect or receive a first biometric signal from the first body part. The second sensor may detect or receive a second biometric signal from the second body part. The sensor may measure a heart rate based on the first biometric signal and the second biometric signal.

Figure 6:
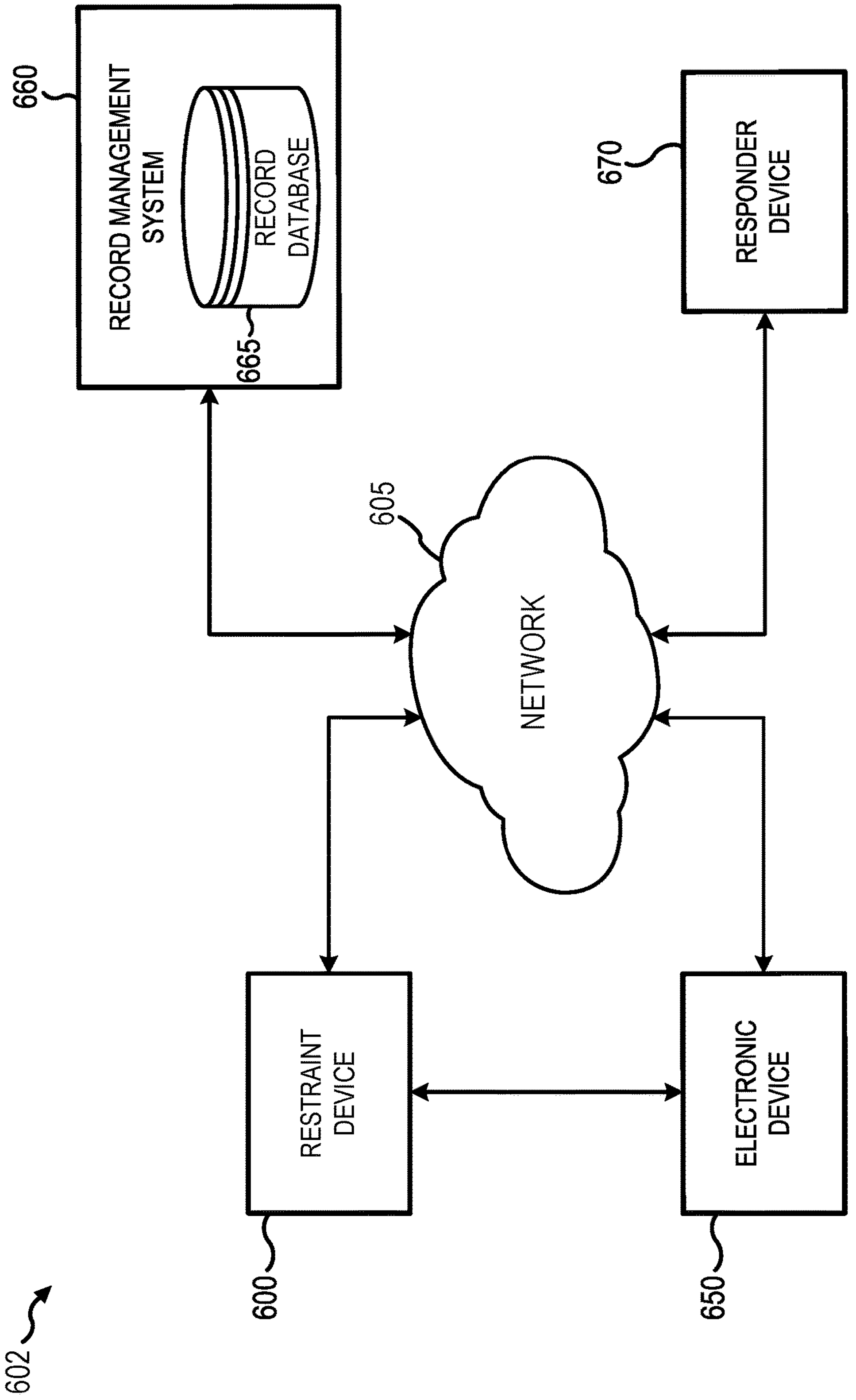
FIG. 6 is a block diagram of a restraint system, in accordance with various embodiments.

In various embodiments, and with reference to FIG. 6, a restraint system 602 is disclosed. Restraint system 602 may comprise one or more of a restraint device 600, an electronic device 650, a record management system 660, and/or a responder device 670.

One or more of restraint device 600, electronic device 650, record management system 660, and/or responder device 670 may be in electronic communication via a network 605.

In various embodiments, network 605 may be configured to enable electronic communications between one or more systems or devices of system 602. In that respect, network 605 may comprise any communication channel capable of enabling long-range communications or short-range communications. For example, network 605 may enable electronic communications through one or more communication channels such as a telephone network, a cellular network, an extranet, an intranet, the internet, a wireless communication, a wireless personal area network (WPAN), a local area network (LAN), a wide area network (WAN), a virtual private network (VPN), and/or the like.

In various embodiments, one or more of the communication channels enabling electronic communications in network 605 may be unsecure. Electronic communications disclosed herein via network 605 may utilize data encryption. Encryption may be performed by way of any of the techniques disclosed herein, now available in the art, or which may become available. For the sake of brevity, conventional data networking, application development, and other functional aspects of system may not be described in detail herein. Furthermore, the connecting lines shown in the various figures contained herein are intended to represent exemplary functional relationships and/or electronic communications between the various system 602 components. Many alternative or additional functional relationships or electronic communications may be present in a practical system.

In various embodiments, restraint device 600 may be similar to any other restraint device disclosed herein, such as, for example, restraint device 100 (with brief reference to FIG. 1A or 1B), restraint device 200 (with brief reference to FIG. 2), restraint device 300 (with brief reference to FIG. 3), restraint device 400 (with brief reference to FIG. 4), and/or restraint device 500 (with brief reference to FIG. 5). Restraint device 600 may be configured to detect biometric information, generate alerts, transmit alerts, output alerts, perform operations based on alerts, and/or the like, as previously discussed herein. Restraint device 600 may be in electronic communication with electronic device 650. Restraint device 600 may be in electronic communication with electronic device 650 via a short-range wireless communication. In some embodiments, restraint device 600 may be in electronic communication with network 605 (e.g., via a long-range wireless communication).

In various embodiments, electronic device 650 may comprise any suitable or desired electronic device. Electronic device 650 may comprise any combination of hardware and/or software components. For example, electronic device 650 may comprise hardware such as a processing unit, a communications unit, a memory unit, an input device, and/or an output device. Electronic device 650 may also comprise software configured to manage and/or interact with the hardware components, such as, for example, an operating system, user interfaces, software applications, and/or the like. In various embodiments, electronic device 650 may comprise a telecommunications device such as, for example, a landline telephone, an IP telephone, a mobile telephone, a cellular telephone, a smart telephone (e.g., IPHONE®, ANDROID®, etc.), and/or the like. In various embodiments, electronic device 650 may be a computing device such as a server, a computer-based system, a portable computer-based system (e.g., a laptop, a notebook, a handheld computer, a tablet, a personal digital assistant, etc.), a cellular telephone, a smart telephone, a wearable device (e.g., a smart watch, smart glasses, etc.), an internet of things (IoT) device, and/or any other device capable of transmitting and/or receiving data over a network. In various embodiments, electronic device 650 may comprise a camera such as a body-worn camera, a vehicle mounted camera, a vehicle recording manager, and/or the like. In various embodiments, electronic device 650 may comprise an electronic weapon such as a less-lethal weapon (e.g., conducted electrical weapon, etc.).

Electronic device 650 may be in electronic communication with restraint device 600 (e.g., via short-range wireless communication). Electronic device 650 may be in electronic communication with network 605 (e.g., via long-range wireless communication. Electronic device 650 may be configured to receive alerts, biometric information, and the like from restraint device 600. Electronic device 650 may be configured to output an alert. Electronic device 650 may be configured to transmit alerts, biometric information, and the like to other systems and devices in restraint system 602 via network 605 (e.g., record management system 660, responder device 670, etc.).

In various embodiments, record management system 660 may be configured to receive, provide, manage, and/or store data in restraint system 602. Record management system 660 may include at least one computing device in the form of a computer or processor, or a set of computers or processors, although other types of computing units or systems may be used, such as, for example, a processing circuit, a server, web server, pooled servers, or the like. Record management system 660 may comprise a database management system (DBMS) configured to define, manipulate, retrieve, and manage data in a database or data structure. Record management system 660 may comprise a record database 665 configured to store and maintain the record data. Record database 665 may comprise any suitable database, data structure, or the like capable of storing and maintaining data. Record database 665 may store and maintain the record data using any suitable process. Record management system 660 may be in electronic communication with one or more other systems and devices in restraint system 602, via network 605.

In various embodiments, record management system 660 may be an evidence management system. An evidence management system receives, provides, manages, and/or stores evidence. An evidence management system may store evidence. For example, in a practical application the evidence management system may store evidence received from a law enforcement agency. The evidence may include any type of data including text, audio, image, and/or video. The evidence may comprise biometric information, alerts, and/or the like received from restraint device 600. The evidence may be stored on servers or databases (e.g., record database 665) and accessed via a network. An evidence management system may include a server to perform the functions of an evidence management system. The server may include one or more servers and/or computing devices. The server may control other electronic devices to perform the functions of an evidence management system. The server may include engines and data stores which operate to store and process data and metadata received from systems and devices in system 602. In various embodiments, record management system 660 may comprise a cloud-based distributed evidence management system, such as, for example, AXON EVIDENCE offered by Axon Enterprise, Inc.

In various embodiments, the record data (e.g., biometric information, alerts, etc.) may relate to an event (e.g., incident, emergency, non-emergency, etc.). The record data may provide a record of the event and the occurrences that took place during the event. The record data may be used as evidence to establish the occurrences of the event.

In various embodiments, record management system 404 may be a compliance, workflow, evidence, and/or reporting system, such as, for example, AXON RECORDS offered by Axon Enterprise, Inc.

In various embodiments, responder device 670 may allow an emergency responder, emergency receiver, or the like (collectively, "emergency personnel") to receive biometric information, alerts, and/or the like from restraint device 600. As discussed herein, an "emergency responder" may include an individual, or group of individuals, that performs emergency (or related non-emergency) services. For example, the emergency responder may be a law enforcement officer, a firefighter, an emergency medical technician (EMT), a paramedic, an ambulance technician, an animal control officer, a utility service personnel, and/or the like. The emergency responder may be a government employee or a private employee (e.g., a security guard). As discussed herein, an "emergency receiver" may include a call operator, a call taker, a call dispatcher, or the like responsible for acting as an intermediary to relay an emergency event to the emergency responder. The emergency receiver may be located in an emergency communication center, a police station, a firehouse, and/or the like. The emergency receiver may be an individual or a group of individuals (e.g., a call taker and a call dispatcher). For example, the emergency receiver may be a single individual responsible for taking the incoming communication and coordinating an appropriate response with an emergency responder. As a further example, a first emergency receiver (e.g., a call taker) may receive the incoming communication, input data regarding the communication, and transmit the data input to a second emergency receiver. The second emergency receiver (e.g., a call dispatcher) may receive the data input and coordinate an appropriate response with an emergency responder. The emergency receiver may include a system (e.g., a computer-based system) configured to at least partially receive the emergency communication and/or enable the emergency receiver to input data regarding the emergency communication.

In various embodiments, responder device 670 (e.g., emergency responder device, emergency device, mobile data terminal, mobile digital computer, etc.) may be configured to allow an emergency responder to receive biometric information, alerts, and the like Responder device 670 may comprise any combination of hardware and/or software components. For example, responder device 670 may comprise hardware such as a processing unit, a communications unit, a memory unit, an input device, and/or an output device. Responder device 670 may also comprise software configured to manage and/or interact with the hardware components, such as, for example, an operating system, user interfaces, software applications, and/or the like. In various embodiments, responder device 670 may comprise a telecommunications device such as, for example, a mobile telephone, a cellular telephone, a smart telephone (e.g., IPHONE®, ANDROID®, etc.), and/or the like. In various embodiments, responder device 670 may be a computing device such as a server, a computer-based system, a portable computer-based system (e.g., a laptop, a notebook, a handheld computer, a tablet, a personal digital assistant, etc.), a cellular telephone, a smart telephone, a wearable device (e.g., a smart watch, smart glasses, etc.), an internet of things (IoT) device, and/or any other device capable of transmitting and/or receiving data over a network.

In various embodiments, responder device 670 may comprise a mobile data terminal (MDT), mobile digital computer (MDC), and/or similar device used in emergency and non-emergency vehicles to communicate with computer-aided dispatching systems. An MDT, MDC, or similar device may facilitate communications with an emergency receiver, and may also be configured to display data relevant to the emergency communication, such as, for example, biometric information, alerts, etc.

In various embodiments, responder device 670 may also comprise equipment carried or used by an emergency responder. For example, in response to the emergency responder being a law enforcement officer, the responder device 670 may comprise a body camera (e.g., a recording device configured to be worn by the law enforcement officer), a radio, a conducted electrical weapon (CEW), and/or the like. The body camera may comprise a camera configured to digitally capture an image (e.g., a static image, a video, etc.), together with an audio input (e.g., microphone) and an audio output (e.g., audio speaker). The responder device 670 may also comprise a camera mounted on the vehicle of the emergency responder, and/or an associate recording manager in communication with the camera.

In various embodiments, an emergency responder may have or interact with a plurality of responder devices 670. For example, emergency responder 670 may have a computer-based system together with additional equipment (as discussed herein). The plurality of responder devices 670 may be in electronic communication with each other. For example, an emergency responder's mobile data terminal may be in electronic communication with the emergency responder's body camera, smart phone, and/or CEW.

Figure 7:
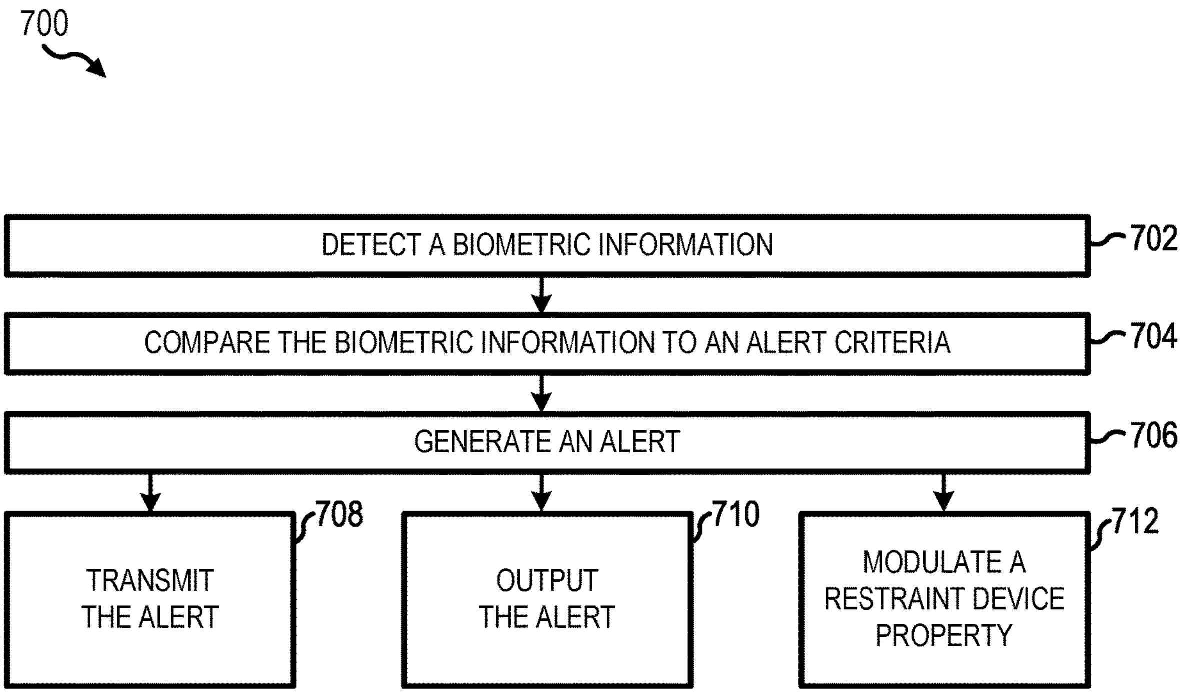
FIG. 7 illustrates a process flow for a method of generating an alert for a restraint device, in accordance with various embodiments.

Referring now to FIG. 7, the process flows depicted are merely embodiments and are not intended to limit the scope of the disclosure. For example, the steps recited in the process descriptions may be executed in any order and are not limited to the order presented. It will be appreciated that the following description makes appropriate references not only to the steps depicted in FIG. 7, but also to the various device and system components as described above with reference to FIGS. 1-6, and as described below with reference to FIG. 8.

In various embodiments, and with specific reference to FIG. 7, a method 700 for generating an alert from an electronic restraint device is disclosed. Method 700 may be performed by one or more of any device, system, processing circuit, and/or the like disclosed herein (collectively, the "electronic restraint device").

The electronic restraint device may detect a biometric information (step 702). The biometric information may relate to bio-signals from a human restrained by the electronic restraint device. The biometric information may also comprise non-bio-signal data, such as, for example, status information, physical properties, or the like of the electronic restraint device. The biometric information may include one or more of a heart rate, a skin temperature, a blood oxygen saturation level, and/or the like. The biometric information may also comprise device information such as a pressure, a movement, a location information, an audio input, and/or the like. The biometric information may also comprise status information such as a timestamp of the electronic restraint device being locked (e.g., restraint engaged), a timestamp of the electronic restraint device being unlocked (e.g., restraint disengaged), chain of custody data including credentials of a law enforcement officer, security personnel, or the like assigned to the electronic restraint device or receiving custody of the human restrained by the electronic restraint device, and/or the like.

The biometric information may be detected by the electronic restraint device using a sensor. The sensor may comprise a single sensor or a plurality of sensors. The sensor may detect the biometric information from a single appendage of a human restrained by the electronic restraint device. The sensor may detect the biometric information from a plurality of appendages of a human restrained by the electronic restraint device. The sensor may detect the biometric information from a common measurement taken at each of a first appendage and a second appendage of a human restrained by the electronic restraint device. For example, the sensor may comprise a first sensor configured to detect a first biometric signal at the first appendage and a second sensor configured to detect a second biometric signal at the second appendage. The biometric information may be based on the first biometric signal and the second biometric signal.

The electronic restraint device may compare the biometric information to an alert criteria (step 704). The alert criteria may comprise thresholds, ranges, low values, high values, and/or the like configured to be compared against the biometric information. The alert criteria may comprise a heart rate threshold, a skin temperature threshold, a blood oxygen saturation level threshold, a pressure threshold, an identified movement, an identified location, an identified audio, and/or the like.

The electronic restraint device may generate an alert (step 706). The alert may be generated based on the comparison of the biometric information to the alert criteria. For example, in response to the biometric information not matching or meeting the alert criteria, the electronic restraint device may not generate the alert. In response to the biometric information matching or meeting the alert criteria, the electronic restraint device may generate the alert. The alert may be generated to comprise the biometric information, the alert criteria, and/or any other suitable or desired information, instructions, and/or the like The electronic restraint device may transmit the alert (step 708). The alert may be transmitted to an electronic device. The alert may be transmitted over a network. For example, in some embodiments the alert may be transmitted directly via short-range wireless communication to an electronic device. The alert may comprise data regarding the biometric information, the alert criteria, and/or the like. The alert may comprise instructions to perform an operation based on the alert. For example, the electronic device may comprise a camera, such as a body-worn camera, a vehicle mounted camera, or the like. The alert may comprise instructions for the camera to activate to record audio and/or visual data. As a further example, the electronic device may comprise an electronic weapon, such as a less-lethal weapon (e.g., conducted electrical weapon, etc.). The alert may comprise instructions for the electronic weapon to deactivate a safety. The electronic device may be configured to transmit the alert to a record management system. The electronic device may be configured to transmit the alert to a responder device.

The electronic restraint device may output the alert (step 710). The alert may be output on the electronic restraint device. For example, in some embodiments the alert may comprise an audio output and/or a visual output. In that respect, the electronic restraint device may output a sound, activate a light, activate a visual display, and/or the like based on the alert. The alert may be output by an electronic device receiving the alert (e.g., at step 708).

The electronic restraint device may modulate a restraint device property (step 712) based on the alert. The restraint device property may be associated with one or more components or properties of the electronic restraint device, such as a pressure modulator, a connecting member modulator, or the like, as discussed further herein. The electronic restraint device may modulate the restraint device property by adjusting a pressure (e.g., decreasing a pressure, increasing a pressure, etc.), adjusting a length of a connecting member (e.g., increasing a length, decreasing a length, etc.), and/or the like, as discussed further herein.

Figure 8:
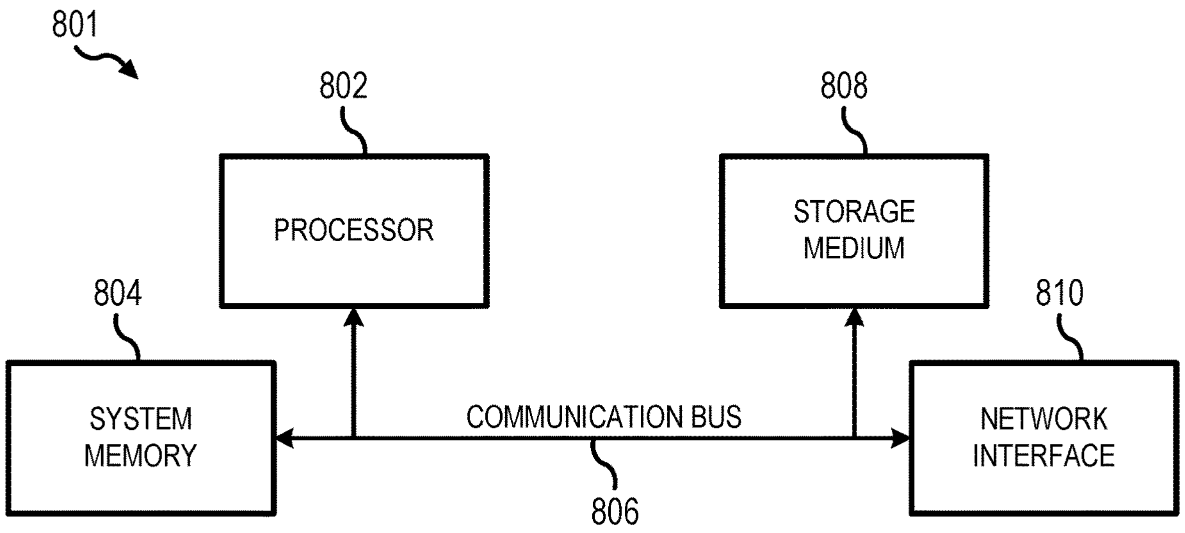
FIG. 8 is a block diagram illustrating components of a computer-based system, in accordance with various embodiments.

In various embodiments, and with reference to FIG. 8, an exemplary computer-based system 801 is disclosed. Computer-based system 801 may be appropriate for use in accordance with embodiments of the present disclosure. The accompanying description of computer-based system 801 may be applicable to servers, personal computers, mobile phones, smart phones, tablet computers, embedded computing devices, electronic devices, and other currently available or yet-to-be-developed devices that may be used in accordance with embodiments of the present disclosure.

Computer-based system 801 may include a processor 802 and a system memory 804 connected by a communication bus 806. Depending on the exact configuration and type of computer-based system, system memory 804 may be volatile or nonvolatile memory, such as read only memory ("ROM"), random access memory ("RAM"), EEPROM, flash memory, or other memory technology. Those of ordinary skill in the art and others will recognize that system memory 804 typically stores data and/or program modules that are immediately accessible to and/or currently being operated on by processor 802. In this regard, processor 802 may serve as a computational center of computer-based system 801 by supporting the execution of instructions. Processor 802 may comprise one or more processing units, as discussed further herein. System memory 804 may comprise one or more memory units, as discussed further herein.

Computer-based system 801 may include a network interface 810 comprising one or more components for communicating with other devices and systems over a network. Embodiments of the present disclosure may access basic services that utilize network interface 810 to perform communications using common network protocols. Network interface 810 may comprise a communications unit, as discussed further herein.

Computer-based system 801 may also include a storage medium 808. However, services may be accessed using a computer-based system that does not include means for persisting data to a local storage medium. Therefore, storage medium 808 depicted in FIG. 8 is optional. Storage medium 808 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like. Storage medium 808 may include one or more memory units, as discussed further herein.

As used herein, the term "computer-readable medium" includes volatile and nonvolatile and removable and nonremovable media implemented in any method or technology capable of storing information, such as computer-readable instructions, data structures, program modules, or other data. In this regard, system memory 804 and storage medium 808 depicted in FIG. 8 are examples of computer-readable media.

For ease of illustration and because it is not important for an understanding of the claimed subject matter, FIG. 8 does not show some of the typical components of many computer-based systems. In this regard, computer-based system 801 may include input devices, such as a keyboard, keypad, mouse, trackball, microphone, video camera, touchpad, touchscreen, electronic pen, stylus, and/or any other input device described herein. Such input devices may be coupled to computer-based system 801 by wired or wireless connections including radio frequency (RF), infrared, serial, parallel, long range communication, short range communication, universal serial bus (USB), or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computer-based system 801 (e.g., a client device), or can be integral components of computer-based system 801. In some embodiments, multiple input devices may be combined into a single, multifunction input device (e.g., a video camera with an integrated microphone).

Computer-based system 801 may also include output devices such as a display, speakers, printer, and/or any other output device described herein. The output devices may include video output devices such as a display or touchscreen. The output devices also may include audio output devices such as external speakers or earphones. The output devices can be separate from and communicatively coupled to computer-based system 801, or can be integral components of computer-based system 801. Input functionality and output functionality may be integrated into the same input/output device (e.g., a touchscreen). Any suitable input device, output device, or combined input/output device either currently known or developed in the future may be used with described systems.

In various embodiments, a "processing unit" as described herein may comprise any suitable hardware and/or software-based processing component. For example, a processing unit may comprise one or more of a processing circuit, a processor, an application specific integrated circuit (ASIC), a controller, a microcontroller, a microprocessor, a programmable logic device, logic circuitry, and/or the like.

In various embodiments, a "communications unit" as described herein may comprise any suitable hardware and/or software components capable of enabling the transmission and/or reception of data. A communications unit may enable electronic communications between devices and systems. A communications unit may enable communications over a network. Examples of a communications unit may include a modem, a network interface (such as an Ethernet card), a communications port, etc. Data may be transferred via a communications unit in the form of signals which may be electronic, electromagnetic, optical, or other signals capable of being transmitted or received by a communications unit. A communications unit may be configured to communicate via any wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or any other protocol capable of transmitting information via a wired or wireless connection.

Two or more of the system components may be in electronic communication via a network. As used herein, the term "network" may further include any cloud, cloud computing system, or electronic communications system or method that incorporates hardware and/or software components. Communication amongst the devices and systems over a network may be accomplished through any suitable communication channel, such as, for example, a telephone network, an extranet, an intranet, the internet, a wireless communication, local area network (LAN), wide area network (WAN), virtual private network (VPN), and/or the like.

Electronic communications between the systems and devices may be unsecure. A network may be unsecure. Electronic communications disclosed herein may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

In various embodiments, a "memory unit" as discussed herein may comprise any hardware, software, and/or database component capable of storing and maintaining data. For example, a memory unit may comprise a database, data structure, memory component, or the like. A memory unit may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

Any database discussed herein may include relational, hierarchical, graphical, distributed ledger, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Moreover, a database may be organized in any suitable manner, for example, as data tables or lookup tables. Each record stored in a database may be a single file, a series of files, a linked series of data fields, and/or any other data structure or schema.

Any database, system, device, server, or other components of the system described herein may consist of any combination thereof at a single location or at multiple locations. For example, any database described herein may comprise a single database or a plurality of databases (virtual partitions or physically distinct). Each database or system may include any of various suitable security features, such as firewalls, access codes, encryption, decryption, compression, decompression, and/or the like.

In various embodiments, an "input device" as discussed herein may comprise hardware and/or software used to provide data, inputs, control signals, and the like to a computer-based system, software application, etc. For example, an input device may include a pointing device (e.g., mouse, joystick, pointer, etc.), a keyboard (e.g., virtual or physical), a touchpad or touchscreen interface, a video input device (e.g., camera, scanner, multi-camera system, etc.), a virtual reality system, an audio input device (e.g., microphone, digital musical instrument, etc.), a biometric input device (e.g., fingerprint scanner, iris scanner, etc.), a composite device (e.g., a device having a plurality of different forms of input), and/or any other input device.

In various embodiments, an "output device" as discussed herein may comprise hardware and/or software configured to convert information into a human-accessible form, for display, projection, or physical reproduction. For example, an output device may include a display device (e.g., monitor, monochrome display, colored display, CRT, LCD, LED, projector, video card, etc.), an audio output device (e.g., speaker, headphones, sound card, etc.), a location services system (e.g., global positioning system (GPS), etc.), a printer (e.g., dot matrix printer, inkjet printer, laser printer, 3D printer, wide-format printer, etc.), a braille reader, a composite device (e.g., a device having a plurality of different forms of output), and/or any other output device.

In various embodiments, "satisfy," "meet," "match," "associated with," or similar phrases used herein may include an identical match, a partial match, meeting certain criteria, matching a subset of data, a correlation, satisfying certain criteria, a correspondence, an association, an algorithmic relationship, and/or the like. Similarly, as used herein, "authenticate," "verify," "validate," or similar terms may include an exact authentication, verification, or validation; a partial authentication, verification, or validation; authenticating, verifying, or validating a subset of data; satisfying certain criteria; an association; an algorithmic relationship; and/or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for generating an alert from an electronic restraint device, the method comprising:

detecting, by the electronic restraint device, biometric information comprising a first biometric signal and a second biometric signal, wherein the first biometric signal is detected by a first sensor of a first restraint member of the electronic restraint device, wherein the second biometric signal is detected by a second sensor of a second restraint member of the electronic restraint device, and wherein the first restraint member is mechanically coupled and electrically coupled to the second restraint member;

comparing, by a processing circuit of the first restraint member of the electronic restraint device, the biometric information to an alert criteria; and generating, by the electronic restraint device, an alert based on the comparing.

2. The method of claim 1, wherein the biometric information comprises at least one of a heart rate, a skin temperature, a blood oxygen saturation level, a pressure, a movement, or a location information.

3. The method of claim 1, wherein the alert criteria comprises at least one of a heart rate threshold, a skin temperature threshold, a blood oxygen saturation level threshold, a pressure threshold, an identified movement, or an identified location.

4. The method of claim 1, further comprising transmitting, by the electronic restraint device, the alert to an electronic device.

5. The method of claim 4, further comprising transmitting, by the electronic restraint device, the biometric information to the electronic device.

6. The method of claim 1, further comprising outputting, by the electronic restraint device, the alert, wherein the alert comprises at least one of an audio output or a visual output.

7. The method of claim 1, further comprising modulating, by the electronic restraint device, a restraint device property based on the alert.

8. The method of claim 7, wherein modulating the restraint device property comprises adjusting, by the electronic restraint device, a pressure modulator.

9. The method of claim 7, wherein modulating the restraint device property comprises adjusting, by the electronic restraint device, a length of a connecting member mechanically coupling the first restraint member to the second restraint member.

10. The method of claim 1, wherein the electronic restraint device comprises a mechanical connecting member configured to mechanically couple the first restraint member to the second restraint member, and wherein the electronic restraint device comprises an electrical connecting member configured to electrically couple the first restraint member to the second restraint member.

11. An electronic restraint device comprising:

a first restraint member configured to contact a first body part of a human, wherein the first restraint member comprises:

a first restraint opening; and a first sensor positioned proximate the first restraint opening, wherein the first sensor is configured to capture a first biometric signal from the first body part;

a second restraint member configured to contact a second body part of the human, wherein the second restraint member is mechanically coupled and electrically coupled to the first restraint member, and wherein the second restraint member comprises:

a second restraint opening; and a second sensor positioned proximate the second restraint opening, wherein the second sensor is configured to capture a second biometric signal from the second body part; and an output interface positioned in one of the first restraint member or the second restraint member, wherein the output interface is in electrical communication with the first sensor and the second sensor, wherein the output interface is configured to compare the first biometric signal and the second biometric signal with an alert criteria, and wherein the output interface is configured to generate an alert based on the compare.

12. The electronic restraint device of claim 11, wherein a common biometric measurement is taken at each of the first sensor and the second sensor.

13. The electronic restraint device of claim 11, further comprising:

a connecting member configured to mechanically couple and electrically couple the first restraint member to the second restraint member, wherein the connecting member defines a length between the first restraint member and the second restraint member.

14. The electronic restraint device of claim 13, wherein the output interface comprises a connecting member modulator disposed proximate the connecting member, and wherein the connecting member modulator is configured to adjust the length between the first restraint member and the second restraint member based on the alert.

15. The electronic restraint device of claim 13, wherein the connecting member comprises a mechanical connecting member and an electrical connecting member.

16. An electronic restraint system comprising:

a restraint device comprising:

a first restraint member configured to contact a first body part of a human, wherein the first restraint member comprises:

a first restraint opening; and a first sensor positioned proximate the first restraint opening, wherein the first sensor is configured to capture a first biometric signal from the first body part;

a second restraint member configured to contact a second body part of the human, wherein the second restraint member is mechanically coupled and electrically coupled to the first restraint member, and wherein the second restraint member comprises:

a second restraint opening; and a second sensor positioned proximate the second restraint opening, wherein the second sensor is configured to capture a second biometric signal from the second body part;

a communications module positioned within the first restraint member; and an output interface positioned within the first restraint member, wherein the output interface is in electrical communication with the first sensor and the second sensor, wherein the output interface is configured to compare the first biometric signal and the second biometric signal with an alert criteria, and wherein the output interface is configured to generate an alert based on the compare; and an electronic device in electronic communication with the communications module, wherein the communications module is configured to transmit the alert to the electronic device.

17. The electronic restraint system of claim 16, wherein the electronic device comprises a camera, and wherein the camera is configured to capture at least one of audio or video in response to receiving the alert.

18. The electronic restraint system of claim 16, wherein the electronic device comprises a less-lethal weapon, and wherein the less-lethal weapon is configured to deactivate a safety in response to receiving the alert.

19. The electronic restraint system of claim 16, wherein in response to receiving the alert, the electronic device is configured to transmit the alert to a responder device of an emergency personnel.

20. The electronic restraint system of claim 16, wherein the restraint device comprises a mechanical connecting member configured to mechanically couple the first restraint member to the second restraint member, and wherein the restraint device comprises an electrical connecting member configured to electrically couple the first restraint member to the second restraint member.

* * * * *